US010002313B2

(12) United States Patent
Vaca Castano et al.

(10) Patent No.: US 10,002,313 B2
(45) Date of Patent: Jun. 19, 2018

(54) DEEPLY LEARNED CONVOLUTIONAL NEURAL NETWORKS (CNNS) FOR OBJECT LOCALIZATION AND CLASSIFICATION

(71) Applicant: Sighthound, Inc., Winter Park, FL (US)

(72) Inventors: Gonzalo Vaca Castano, Orlando, FL (US); Syed Zain Masood, Orlando, FL (US); Stephen Neish, Winter Park, FL (US)

(73) Assignee: Sighthound, Inc., Winter Park, FL (US)

( * ) Notice: Subject to any disclaimer, the term of this patent is extended or adjusted under 35 U.S.C. 154(b) by 9 days.

(21) Appl. No.: 15/379,277

(22) Filed: Dec. 14, 2016

(65) Prior Publication Data

US 2017/0169315 A1    Jun. 15, 2017

Related U.S. Application Data

(60) Provisional application No. 62/267,731, filed on Dec. 15, 2015.

(51) Int. Cl.
*G06K 9/00*    (2006.01)
*G06K 9/68*    (2006.01)
(Continued)

(52) U.S. Cl.
CPC ............. *G06K 9/6814* (2013.01); *G06K 9/34* (2013.01); *G06K 9/4628* (2013.01);
(Continued)

(58) Field of Classification Search
CPC ............. G06K 9/6814; G06K 9/00281; G06K 9/00288; G06K 9/323; G06K 9/34;
(Continued)

(56) References Cited

U.S. PATENT DOCUMENTS 5,802,220 A    9/1998    Black et al.
5,812,787 A    9/1998    Astle
(Continued)

OTHER PUBLICATIONS

Cheng et al., "Real-Time Discriminative Background Subtraction," IEEE Transactions on Image Processing, 20(5). pp. 1401-1414. Oct. 18, 2010.
(Continued)

*Primary Examiner* — Daniel Mariam
(74) *Attorney, Agent, or Firm* — Davis Wright Tremaine LLP; Philip H. Albert

(57) ABSTRACT

A Convolutional Neural Network (CNN) includes an initial set of convolutional layers and max pooling units, in which any input is convoluted with the learned image filters and the output is a stack of the different filter responses. Max pooling produces a scaled version of the output. The process can be repeated several times, resulting in a stack of space invariant-scaled images. Since the operation is space invariant, the computations of these layers not need to be recomputed if interested just in certain regions of the image. A Region Of Interest (ROI) Pooling layer is used to select regions to be processed by the set of fully connected layers, which uses the response of the multiple convolutional layers of the network to determine the regions where the objects (of different scales) could be located. This object proposal method is implemented as a Region Of Interest (ROI) Selector.

23 Claims, 6 Drawing Sheets

(51) Int. Cl.
  *G06K 9/62* (2006.01)
  *G06K 9/46* (2006.01)
  *G06K 9/34* (2006.01)
  *G06T 7/73* (2017.01)
  *G06T 7/136* (2017.01)

(52) U.S. Cl.
  CPC ......... *G06K 9/4671* (2013.01); *G06K 9/6286* (2013.01); *G06T 7/136* (2017.01); *G06T 7/74* (2017.01); *G06T 2207/10016* (2013.01); *G06T 2207/20004* (2013.01); *G06T 2207/20016* (2013.01); *G06T 2207/20024* (2013.01); *G06T 2207/20084* (2013.01)

(58) Field of Classification Search
  CPC .. G06K 9/4671; G06K 9/6286; G06K 9/4628; G06T 7/74; G06T 7/136; G06T 2207/10016; G06T 2207/20004; G06T 2207/20016; G06T 2207/20024; G06T 2207/20084; H04N 21/4666
  USPC ........................................ 382/103, 156, 159
  See application file for complete search history.

(56) References Cited

U.S. PATENT DOCUMENTS

| | | |
|---|---|---|
| 6,795,567 B1 | 9/2004 | Cham et al. |
| 7,142,600 B1 | 11/2006 | Schonfeld et al. |
| 7,199,798 B1 | 4/2007 | Echigo et al. |
| 7,200,266 B2 | 4/2007 | Ozer et al. |
| 7,460,689 B1 | 12/2008 | Chan |
| 7,620,204 B2 | 11/2009 | Porikli et al. |
| 7,783,118 B2 | 8/2010 | Zhou |
| 8,036,494 B2 | 10/2011 | Chen |
| 8,116,527 B2 | 2/2012 | Sabol et al. |
| 8,165,345 B2 | 4/2012 | Chau |
| 8,213,679 B2 | 7/2012 | Yao |
| 8,243,987 B2 | 8/2012 | Hampapur et al. |
| 8,306,267 B1 | 11/2012 | Gossweiler, III et al. |
| 8,416,993 B2 | 4/2013 | Springer et al. |
| 8,447,069 B2 | 5/2013 | Huang et al. |
| 8,565,481 B1 | 10/2013 | Smith |
| 8,875,177 B1 | 10/2014 | Sharma et al. |
| 9,693,092 B2 | 6/2017 | Hu et al. |
| 2002/0090114 A1 | 7/2002 | Rhoads et al. |
| 2003/0165193 A1 | 9/2003 | Chen et al. |
| 2004/0233233 A1 | 11/2004 | Salkind et al. |
| 2006/0227862 A1 | 10/2006 | Campbell et al. |
| 2007/0250775 A1 | 10/2007 | Marsico et al. |
| 2008/0037869 A1 | 2/2008 | Zhou |
| 2009/0031382 A1 | 1/2009 | Cope |
| 2009/0158322 A1 | 6/2009 | Cope et al. |
| 2009/0254643 A1 | 10/2009 | Terheggen et al. |
| 2009/0320081 A1 | 12/2009 | Chui et al. |
| 2010/0002082 A1 | 1/2010 | Buehler et al. |
| 2012/0079578 A1 | 3/2012 | Dachiraju et al. |
| 2012/0170832 A1 | 7/2012 | Liu et al. |
| 2013/0016877 A1 | 1/2013 | Feris et al. |
| 2013/0125181 A1 | 5/2013 | Montemayor et al. |
| 2013/0208124 A1 | 8/2013 | Boghossian et al. |
| 2013/0347044 A1 | 12/2013 | Lee et al. |
| 2014/0023341 A1 | 1/2014 | Wang et al. |
| 2014/0172881 A1 | 6/2014 | Petrou et al. |
| 2014/0317671 A1 | 10/2014 | Hu et al. |
| 2014/0349750 A1 | 11/2014 | Thompson et al. |
| 2015/0063704 A1 | 3/2015 | Tobinai |
| 2015/0186713 A1 | 7/2015 | Cao et al. |
| 2015/0254254 A1 | 9/2015 | Kumarasamy et al. |
| 2016/0042621 A1 | 2/2016 | Hogg et al. |
| 2016/0104056 A1* | 4/2016 | He .................... G06K 9/4609 382/158 |
| 2016/0140436 A1* | 5/2016 | Yin .......................... G06N 3/08 706/20 |
| 2016/0163064 A1 | 6/2016 | Ruf et al. |
| 2017/0124409 A1* | 5/2017 | Choi .................... G06N 3/0454 |
| 2017/0124415 A1* | 5/2017 | Choi ........................ G06N 3/08 |
| 2017/0229151 A1 | 8/2017 | Abecassis |

OTHER PUBLICATIONS

Dalal et al., "Histograms of oriented gradients for human detection," IEEE Computer Society Conference on Computer Vision and Pattern Recognition, 2005. vol. 1. pp. 886-893. Jun. 25, 2005.

Déniz et al., "Face recognition using Histograms of Oriented Gradients," Pattern Recognition Letters, 32(12). pp. 1598-1603. Sep. 2011. Published ahead of print Jan. 20, 2011.

Felzenszwalb et al., "A discriminatively trained, multiscale, deformable part model," IEEE Conference on Computer Vision and Pattern Recognition, 2008. pp. 1-8. Jun. 23-28, 2008.

Felzenszwalb et al., "Cascade Object Detection with Deformable Part Models*" 2010 IEEE Conference on Computer Vision and Pattern Recognition (CVPR). pp. 2241-2248. Jun. 13-18, 2010.

Friedman et al., "Image Segmentation in Video Sequences: A Probabilistic Approach," Proceedings of the Thirteenth Conferences on Uncertainty in Artificial Intelligence. pp. 175-181. Aug. 1997.

Gao, "An Improved HOG Based Pedestrian Detector," Foundations and Practical Applications of Cognitive Systems and Information Processing, Advances in Intelligent Systems and Computing, 215. Proceedings of the First International Conference on Cognitive Systems and Information Processing, Beijing, China, Dec. 2012. pp. 577-590. 2014.

Girshick et al., "Object Detection with Grammar Models," Advances in Neural Information Processing Systems, 24. pp. 442-450. 2011.

Girshick et al., "Rich Feature Hierarchies for Accurate Object Detection and Semantic Segmentation," The IEEE Conference on Computer Vision and Pattern Recognication (CVPR). pp. 580-587. Jun. 23-28, 2014.

Girshick, "Fast R-CNN," IEEE International Conference on Computer Vision (ICCV), 2015. pp. 1440-1448. Dec. 7-13, 2015.

Krizhevsky et al., "ImageNet Classification with Deep Convolutional Neural Networks," Advances in Neural Information Processing Systems. pp. 1097-1105. 2012.

Lecun et al., "Gradient-based learning applied to document recognition," Proceedings of the IEEE, 86(11). pp. 2278-2324. Nov. 1998.

Ren et al., "Faster R-CNN: Towards Real-Time Object Detection with Region proposal Networks," Advances in Neural Information Processing Systems 28 (NIPS 2015) 1:91-99, date of conference Dec. 7-12, 2015.

St-Charles et al., "Flexible Background Subtraction With Self-Balanced Local Sensitivity," 2014 IEEE Conference on Computer Vision and Pattern Recognition (CVPR). pp. 408-413. Jun. 23-28, 2014.

Wang et al., "An HOG-LBP Human Detector with Partial Occlusion Handling," 2009 IEEE 12th International Conference on Computer Vision. pp. 32-39. Sep. 29-Oct. 2, 2009.

* cited by examiner

DEEPLY LEARNED CONVOLUTIONAL NEURAL NETWORKS (CNNS) FOR OBJECT LOCALIZATION AND CLASSIFICATION

CROSS-REFERENCE TO RELATED APPLICATIONS

This application claims priority from U.S. Provisional Application No. 62/267,731, filed on Dec. 15, 2015, which is hereby incorporated in its entirety by this reference.

BACKGROUND

The following presents devices, systems and methods that use computer vision technology to detect and classify people and objects.

While motion detection softwares are useful in telling a camera when to start recording, its inability to distinguish between different objects can lead to many hours of wasted footage and false notifications. Consequently, such systems would benefit by improvements in their ability to detect and differentiate, for example, people from animals, vehicles, or other objects. This could significantly reduce the number of false positives and unnecessary alerts sent to users, which can make even the most modern security cameras unusable.

With the increase in the amount of data to process (images or videos), there is growing demand for data categorization via automated methods. One way is to utilize systems that provide tags for 'what' is present in the data. Even though this information is useful, it would be even better if the system can also tell 'where' a certain object is located within the data. Knowing the answer to both 'what' and 'where' can greatly benefit automated data categorization.

SUMMARY

A method includes receiving image data for one or more images, processing each image data to generate location and classification information for objects in the images. This is achieved by processing the image data using a Convolutional Neural Network (CNN). A CNN is a multi-layered image-processing unit comprising convolutional, pooling and rectified linear unit (ReLU) layers. These layers can be arranged in any order as long as they satisfy the input/output size criteria. In order to handle objects of different scales in the image, the network is designed to have a set of convolutional layers at the bottom that are configured to act as scaling layers. The output from these scaling layers is fed into a Region Of Interest (ROI) selector which constructs a list of one or more object location proposals. This list is then handed over to a ROI pooling layer, which extracts feature representations for the object proposals from the corresponding scaling layer. The feature representations and corresponding object location proposals are analyzed by a first set of one or more fully connected layers before constructing a feature representation of the object proposal (ROI feature vector). This ROI feature vector is then passed along both the localization and classification paths. For both paths, the method separately processes the feature vector via one or more fully connected layers. For classification, the result of the fully connected layers is processed using a loss layer that generates a probability of how likely the object belongs to a specific class. For localization, fully connected layer(s) output is used to make adjustments to the object location in the image. The second and third sets of fully connected layers are independent.

A computer vision system includes an image data interface connectable to receive image data and a processing circuitry configured as a Convolutional Neural Network (CNN). The CNN connected to receive and process the image data and generate from these location and classification information of objects within one or more images. The generating includes processing the image data by an initial set of multiple layers including convolutional, pooling and rectified linear unit (ReLU) layers, followed by one or more convolutional layers configured to act as scaling layers to process the output of the initial set of layers. A Region Of Interest (ROI) selector generates a list of one or more object location proposals within the one or more images from the output of the scaling layers. From the generated list, a pooling layer extracts a corresponding feature representation for one or more of the object location proposals. The feature representations and corresponding object location proposals are analyzed by a first set of one or more fully connected layers and, based on the analyzing, a feature vector is constructed. A second set of one or more fully connected layers determines from the feature vector a probability of objects in the corresponding object location proposals belonging to one of a plurality of object categories. A third set of one or more fully connected layers determines from the feature vector of whether to adjust the corresponding object location proposals for the objects. The second and third sets of fully connected layers are independent.

Various aspects, advantages, features and embodiments are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION

Figure 1:
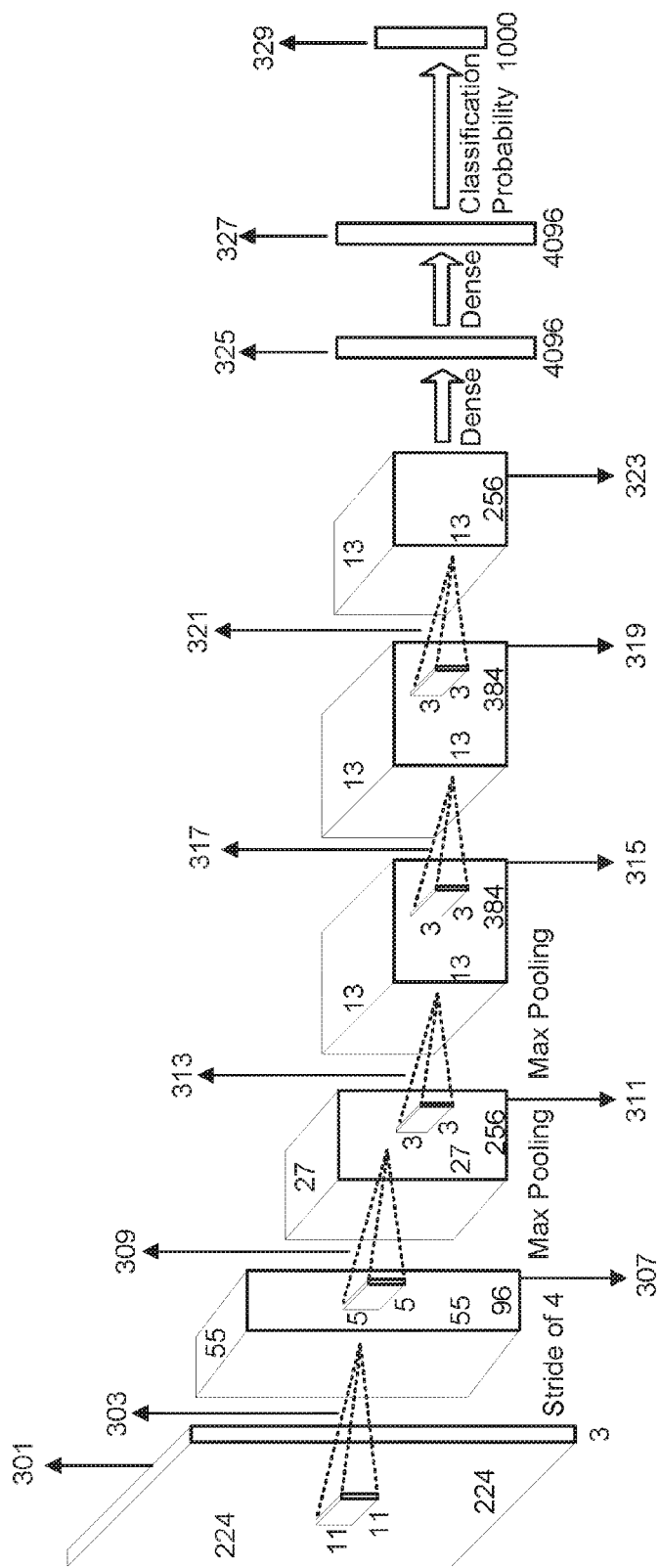
FIG. 1 illustrates a Convolutional Neural Network (CNN) using a multi-layer architecture that comprises an alternate-combination of convolutional and max pooling layers, followed by a stack of fully connected layers.

Deep Learning is a part of machine learning that uses multiple layers of artificial neural networks (and variants) in an attempt to replicate how the brain works. Artificial neural networks are a system of layers with interconnected "neurons" that exchange messages between each other. The connections have numeric weights that can be tuned based on experience, making neural nets adaptive to inputs and capable of learning. It is, in some sense, similar to the traditional multilayer neural networks that were developed during the 1980s with limited success due to lack of convergence to a solution (vanishing gradient problem). However, the new deep networks use training approaches (such as rectified linear unit (ReLU) or Dropout layers) that help to resolve that problem. Further descriptions of Deep Learning can be found in LeCun, Y., Bottou, L., Bengio, Y., and Haffner, P. (1998d). *Gradient-Based Learning Applied to Document Recognition*, Proceedings of the IEEE, 86(11), 2278-2324.

One of the most popular types of deep learning architecture is a Convolutional Neural Network (CNN) (see, for example, Krizhevsky, A., Sutskever, I., and Hinton, G. (2012), *ImageNet Classification with Deep Convolutional Neural Networks*, in NIPS 2012). In computer vision technology, CNNs have significantly improved the image classification task over previous methods. The network can make the explicit assumption that the inputs are images, which allows it to encode certain properties into the architecture. For training purposes, it uses as inputs the image pixels and labels that describe the image. Every output unit represents how likely it is that you can find the label in the input image. Typically, the labels are objects present in the image (human, dog, etc.), or type of scene (house, playground, etc.), but they can be used to train any other property. For example, provided with a set of dog images, it will try to determine which features represent the dog (based on which features are commonly observed for the image set).

Traditional CNNs are designed for a classification tasks (i.e. what is present in a given image), and do not provide any localization information (i.e. where is it located in the image). That trend has recently shifted with increased focus towards incorporating localization information in a CNN along with the classification task. This is useful as it provides precise information of what objects are present in an image plus where they are located in the image.

Most of these methods, however, employ an external localization technique (in either the training phase or the testing phase) to solve the problem. Such methodology requires separate optimization for the localization and classification task which is not ideal. It is preferable if a single unified network can address both concerns.

In contrast, the following presents a CNN design that proposes a unified system (localization built as part of the CNN) that is able to handle classification and localization without the help of external applications. This is useful since it makes the process of training/testing object localization and classification much simpler. Additionally, having a single network to address both tasks reduces processing time without negatively impacting accuracy.

These techniques can be used within systems such as those described in the U.S. patent application Ser. No. 14/969,693 entitled "Computer Vision Pipeline and Methods for Detection of Specified Moving Objects" by Case et al., and the U.S. patent application Ser. No. 14/970,210 entitled "Data-Enhanced Video Viewing System and Methods for Computer Vision Processing" by Masood et al., both filed Dec. 15, 2015, and also more generally.

Convolutional Neural Networks (CNN)

A Convolutional Neural Network (CNN) can be thought of as a layered image-processing pipeline designed to perform a particular task. The goal of the pipeline is to take an image as input, perform mathematical operations and provide a high-level user-friendly response. The processing within the network is sequential in nature: i.e., each layer in the network takes input from the layer(s) above it, does some computation before passing the resulting output to the next layer(s).

Each layer is composed of "neurons" that are connected to "neurons" of other (in most cases adjacent) layers. Each connection has a numeric weight associated with it that signifies its importance.

There are two main steps when working with CNNs: training and testing. Before a CNN can be used for a task, it needs to be trained for that task. In the training phase, the CNN is provided with a list of objects that need to be detected and classified by the network. It is also given a collection of images where each image is associated with a set of user-defined concepts (ground-truth labels based on and not exceeding the object category list). The goal is to tune the connection weights in the network in such a manner so as to produce an output that matches the ground-truth labels as best as possible. This is achieved by combining the weights, network output and ground-truth labels to design a cost function where the cost is zero when network object categorization output matches the image ground-truth labels. Thus, the weights are tuned to bring the cost down as much as possible, which in turn leads to improved accuracy (which is a measurement of how closely the network output and ground-truth labels match). Once the weights have been tuned to get the best possible results for the training data, one can simply use it for testing by passing an image and getting an output.

A CNN includes an ordered stack of different types of layers e.g. convolutional, pooling, ReLU (rectified linear unit), fully connected, dropout, loss, etc. Each layer takes input from one or more layers above it, processes the information and passes the output to one or more layers below it. Generally, a layer takes input from the layer immediately above it and passes the output to the layers immediately below. But it can certainly be designed to take input and pass output from multiple layers.

Each layer comprises of a set number of image filters. The output of filters from each layer is stacked together in the third dimension. This filter response stack then serves as the input to the next layer(s).

The application of filters in each layer on the input can be done in a sliding window manner, where each filter operates on a local neighborhood. This has a few advantages over the fully connected network: (a) the sliding window approach ensures that the weights are shared across the input, meaning the output for each layer is space-invariant. This helps greatly reduce the amount of parameters to learn for the network and (b) because of the sliding window approach, CNNs learn in a hierarchical fashion, starting from basic structure and ending with the complete picture. For example, when finding faces, a CNN starts from small concepts (edges), working its way up to concept of parts (eyes, nose, mouth, etc.) before finishing with the complete face.

Here we will briefly discuss different types of layers in a CNN. In a convolutional layer, the input is convolved with a set of learned image filters, designed to highlight specific characteristics of the image. A pooling layer produces a scaled down version of the output. This is achieved by considering small neighborhood regions and applying the desired operation filter (e.g. min, max, mean, etc.) across the neighborhood. A ReLU layer enhances the nonlinear property of the network by introducing a non-saturating activation function. One example of such a function is to threshold out negative responses (set negative values to zero). A fully connected layer provides a high-level reasoning by connecting each node in the layer to all activation nodes in the previous layer. A dropout layer offers a regularization technique for reducing network over-fitting on the training data by dropping out individual nodes with a certain probability. A loss layer (utilized in training) defines the weight dependent cost function that needs to be optimized (bring cost down to zero) for improved accuracy.

A general construction of a CNN is a combination of convolutional, pooling, ReLU and dropout layers. These layers can be ordered in almost any manner possible, provided the input/output size restrictions are satisfied. What this means is that the output of a layer should be in a format acceptable as input to the layer(s) below it. Fully connected and loss layers, however, are always placed at the end of the network. Some of these layers and their relationships can be illustrated with reference to FIG. 1. This figure illustrates one of the many configurations of a CNN.

The convolutional layer takes as input a 3D array structure (m×m×r), which could be the input image (if first layer) or the result of the previous layer. It then convolves the input with k 3D filters (each n×n×q, where n<=m and q<=r) to produce feature maps. The filters help capture the locally connected structure within an image for the neighborhood specified by the filter. The initial convolutional layers extract low-level features, like edges, lines and corners. As more layers are added, more high-level features are obtained. The last convolutional layers are able to provide part structures: e.g. considering the example of a person, this would have locally connected structures for head, arms, torso, legs, etc. The more layers the network has, the higher-level features it will get. In FIG. 1 pyramids represent the convolutional layer operation.

Max pooling layers subsample each feature map using max pooling over p×p contiguous regions (here, 2<=p<=5). The output from this layer is then fed to the next layer. The main purpose of this layer is to select the best candidate from a given neighborhood. It helps make the method shift-invariant and thus robust to slight changes. This is not limited to the max operation and in fact can be used with other operations (e.g., min, mean, etc.). In FIG. 1 these are represented as "Max pooling".

The fully connected layer is a classical feed forward artificial neural network model that maps sets of input data onto a set of appropriate outputs. It consists of multiple layers of nodes in a directed graph, with each layer fully connected to the next one. Except for the input nodes, each node is a neuron (or processing element) with a nonlinear activation function. These layers take the locally connected structures (e.g. head, arms, legs) and come up with a global structure (e.g. person). In FIG. 1 these are represented as the two vertical rectangles just before the last output layer.

Considering FIG. 1 further, this shows one example of a network, but different networks could have different number of layers with different filters. The first very thin layer 301 is the image, shown to be of size 224×224×3, which is the size expected by this network. (The numerical values here are meant as examples, and different networks can have different input sizes for images and the various elements). This is followed by the output of the 1st convolutional layer (55×55×96) represented at 307, which is obtained by convolving with 96 filters represented at 303, each of size 11×11×3. This is also evaluated at locations with a jump (or "stride") of 4 pixels. Because of this jump, the output with respect to each filter is (224/4−1)×(224/4−1)=55×55. Since the system has outputs from 96 filters, these can be stacked together to form an output of 55×55×96. A first layer of max pooling is performed on this output over 2×2 neighborhoods (no overlaps) to give us an output size of (55/2)×(55/2)×96=27×27×96 (not shown in the figure).

The system takes the output from the first layer of max pooling and uses this in a second convolutional layer with 256 filters, each of size 5×5×96, as represented at 309. The output of each filter is 27×27 (since this time the system will evaluate all pixel location without any jumps). Stacking the outputs of all 256 filters gives the 27×27×256 shown in 311. A second layer of max pooling is performed on this output over 2×2 neighborhoods (no overlaps) to give an output size of (27/2)×(27/2)×256=13×13×256 (not shown in the figure). A third convolutional layer then uses this output with 384 filters, each of size 3×3×256 (shown as 313). The output of each filter is 13×13 (evaluating all pixel location without any jumps). Stacking the outputs of all 384 filters gives the 13×13×384, shown as 315.

A fourth convolutional layer, containing 384 filters, each of size 3×3×384, represented as 317. Since there are no jumps, the output stack is 13×13×384 as shown in 319. A 5th convolutional layer containing 256 filters, each of size 3×3×384, shown as 321, follows this. Since there are no jumps, the output stack is 13×13×256, as shown in 323. A third layer of max pooling is performed on this output over 2×2 neighborhoods (with 1 pixel overlap) to give an output size of (13/1)×(13/1)×256=13×13×256 (not shown in the figure).

The output (13*13*256=43,264) is then flattened to form a 1×43264 representation. This is passed through a multi-layer neural network that takes 1×43264 as input and returns 1×4096 as output. This neural network provides a high level reasoning of a fully connected structure, each pixel location in the output layer connects to each other location. Thus, it will lose spatial information at this point and can represent the output of the fully connected layer as a 1 dimensional vector. The CNN can have multiple fully connected layers (two in this case, 325 and 327, each outputting 1×4096). This can be taken as the final feature of the image and passed through a classifier for each of the object categories, outputting the probability that the image belongs to a certain category. This is represented at 329 as the final 1×1000 vector (for 1000 object categories). The list object categories can be externally supplied and, in the training process, corresponding sets of image data used.

Because of the space-invariant characteristic of CNNs, they are generally used for the task of classification (i.e., "what is in the image?") and not localization (i.e., "where is it in the image?"). What this means is that they are limited to providing tag information for objects present in an image. There have been attempts at solving both the detection as well as the classification problem using CNNs; however, most techniques rely on a two-step process (either for training, testing. or both) of determining regions in the image most likely to contain an object followed by the classification step of identifying the object. This approach, though effective, is not ideal, as it requires optimization of two separate tasks resulting in slower than real-time processing.

The approaches in the exemplary embodiments presented here introduce an extra layer in the network for "region selection". This layer helps determine likely object locations based on the response from preceding layers. This provides for a faster unified system for classification as well as localization and eliminates the cumbersome process of optimizing two separate networks.

In order to have the ability to detect different sized objects, the region selection layer takes input from various layers in the network hierarchy. This helps running detection across a range of scales and thus improves accuracy over different scaled objects.

Related Work on Object Localization Using Deep Networks

As noted above, a problem not tackled in traditional CNNs is the ability to provide the location of the object detected in a given image. To elaborate, given the question "Is there a dog in this picture?" the deep networks described above are only able to answer with a "yes" or "no" response, often with a likelihood probability of the presence of a dog in the image. However, they lack the inherent ability to provide the location of the dog in the image.

Methods to solve the object localization problem using deep networks can use variants of a method called Regions with Convolutional Neural Network (R-CNN) (see, for example, *Rich Feature Hierarchies for Accurate Object Detection and Semantic Segmentation,* Ross Girshick, Jeff Donahue, Trevor Darrell and Jitendra Malik, in CVPR 2014). Roughly speaking, this method uses the power of algorithms to produce generic object proposal regions (a list of bounding boxes at locations where possibly object exists) to extract crops from the image that are then fed into a trained CNN. The network is trained to include a label class for background. Hence, for each image crop, the output of the CNN determines how likely it is to be a particular object or background.

Another approach named Fast Regions with Convolutional Neural Network (Fast-RCNN) proposes a modification over R-CNN to reuse the data processed in the set of convolutional and subsampling layers for the full image (see *Fast R-CNN,* Ross Girshick, in ICCV 2015). An illustration is provided in FIG. 2. The main idea of the method is to move the cropping of the region proposals from the pixel image to the map obtained just before the fully connected layers. For this purpose, a Region Of Interest (ROI) pooling layer is added to the CNN after the convolutional and max pooling layers and before the fully connected layers. Aside from the feature input from the convolutional and max pooling layers, the ROI pooling layers takes input from an external object proposal method for object location determination. In that way the amount of required computations is considerably reduced.

Figure 2:
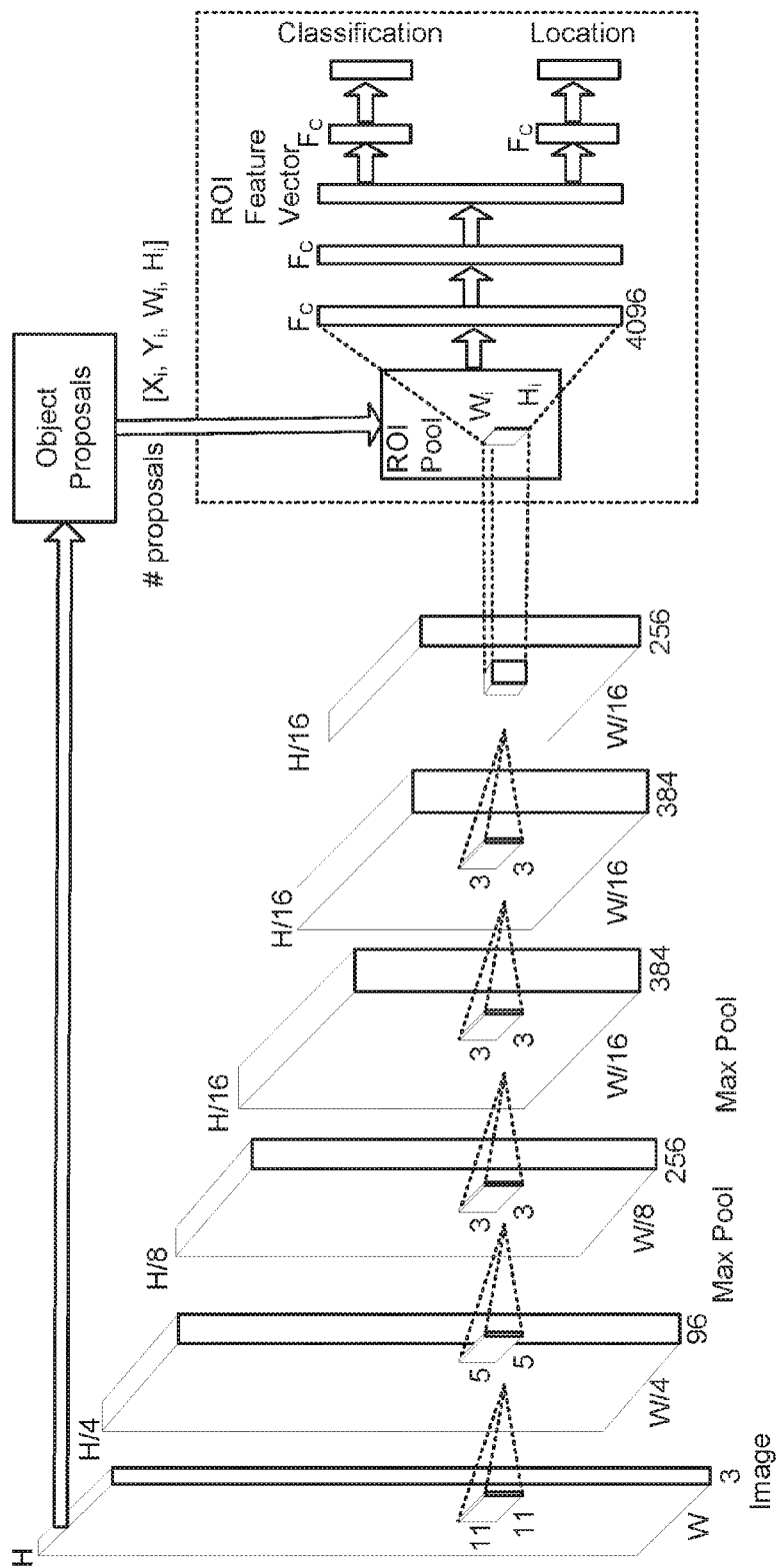
FIG. 2 shows an approach for performing object detection and classification using CNNs and an external step for object region proposals.

In the arrangement of FIG. 2, the image or images are supplied to the external object proposal, which is outside of the CNN, as well as to the CNN. These are two parallel processes, one for determining where an object is (localization) and one for determining what the object is (classification). As these are two separate processes, the proposals from the external object proposal then need to be supplied to the CNN at the ROI pooling layer, here as location information (using X, Y as the left corner plus W, H as the width and height).

Yet another approach is Faster Regions with Convolutional Neural Networks (Faster-RCNN), based on the same principle as Fast-RCNN (see *Faster R-CNN. Towards Real-Time Object Detection with Region proposal Networks,* Shaoqing Ren, Kaiming He, Ross Girshick and Jian Sun, in *NIPS* 2015). It improves on Fast-RCNN by introducing a Region Proposal Network (RPN) that predicts object locations and score. RPNs generate region proposals that are used by Fast R-CNN for detection. The advantage of this approach is that the convolutional layers in both RPN and Fast-RCNN detector are shared: improved and cost effective region proposal generation. Using an alternate optimization technique, one can train and RPN and Fast-RCNN with shared convolutional layers.

Even though these methods address both localization and classification using CNNs, the have some limitations. One of these is a reliance on an external method (either in training or testing or both phases) for generic object proposal, which must be processed in addition to the CNN. Another is that a full forward pass of the CNN is needed for every crop that is tested (meaning for each object in the image), and therefore is slow even in specialized hardware like a Graphical Processing Unit (GPU). Resampling features for each region proposal can be too computationally expensive, and thus much slower, than real-time or near real-time.

Unified Network for Object Localization and Classification

Here we present a unified network for object localization and classification. Instead of relying on external methods (be it training or testing) for object proposal determination, the exemplary embodiments presented here incorporate a Region of Interest (ROI) Selector layer within the network. Additionally, in order to accurately detect and classify objects of various scales, the ROI Selector takes input from a set of convolutional layers (at the bottom of the network) that act as scaling layers.

To improve upon the situation, the system takes advantage of the CNN network with a ROI pooling layer added to it. The ROI pooling layer takes object proposals from the ROI Selector and extracts a fixed-length feature vector from the feature map. It uses max pooling to convert features for object proposal regions into smaller feature maps with fixed spatial extent.

Figure 3:
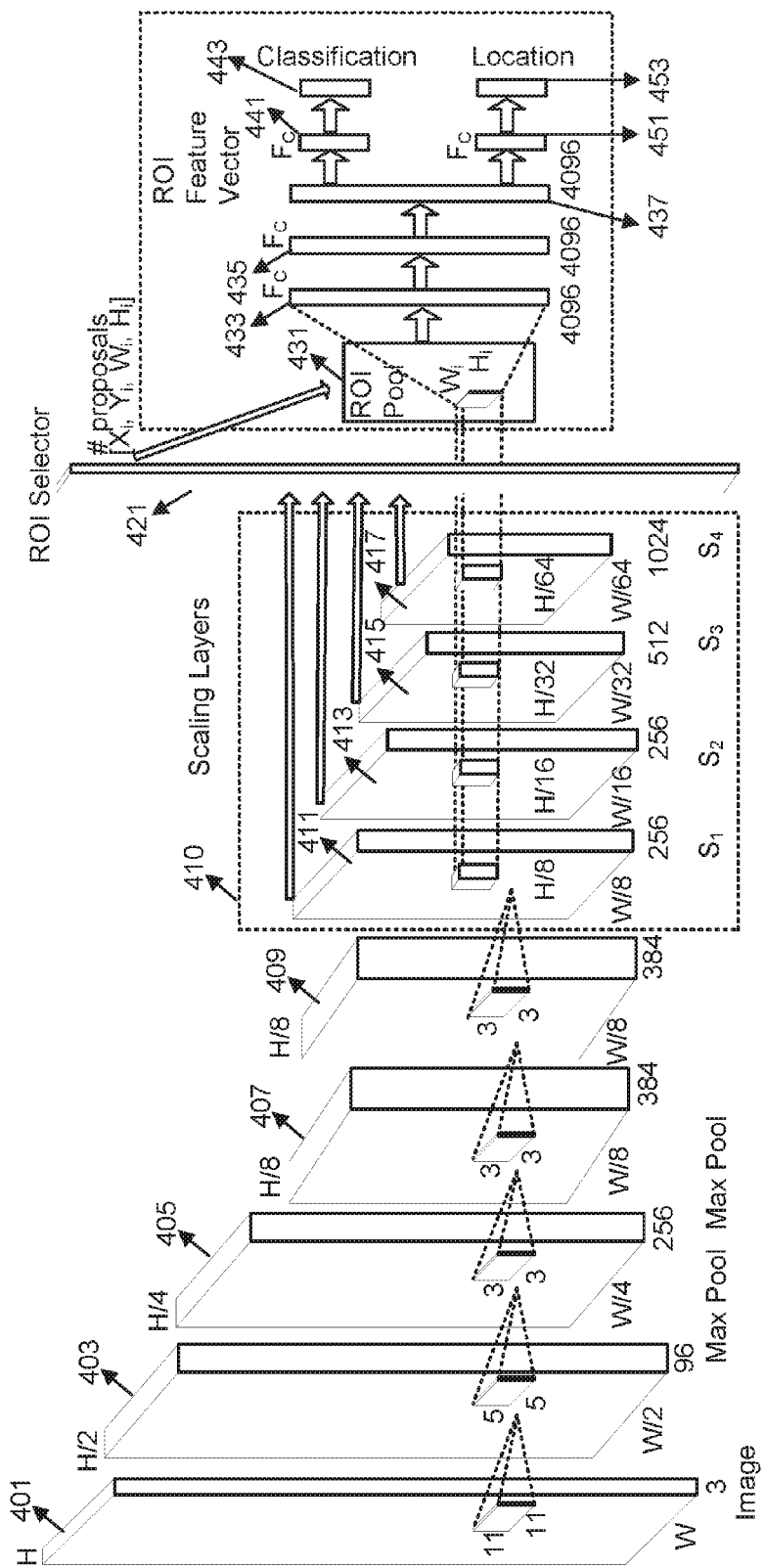
FIG. 3 illustrates an exemplary embodiment where the object region proposal step is built in the CNN using a Region of Interest Selector layer.

An exemplary embodiment for such a network shown in FIG. 3 and is similar to FIG. 2, except it is able to take a higher resolution image (double in this case but can be any size), has additional convolutional layers for multi-scale detection and a Region of Interest (ROI) Selector layer which replaces the external object proposal method.

The image data 401, whether from a single image or multiple images as for a sequence of video frames, is processed by set of initial layers 403-409, including convolutional, pooling and rectified linear unit (ReLU) layers, before going to a scaling layer section 410 of one or more (here a series of four, $S_1$-$S_4$ 411-417). To address the problem of detecting small-sized objects, the network in FIG. 3 is able to work with higher resolution images as compared to previous methods. Additionally, in order to more accurately detect objects of different sizes, ROIs can be determined using more than one layer. For this reason, the ROI Selector layer in the example of FIG. 3 takes input from multiple preceding layers 411-417, making the detection robust to object scale.

A ROI Selector 421 provides, for each object proposal, a location (using X, Y as the left corner plus W, H as the width and height) and indication of the scaling layer ($S_i$) where it is most confident. A ROI Pooling layer 421 is used to select regions to be processed by the set of fully connected layers 433 and 435, which can be similar to those in FIG. 2, to generate an ROI feature vector 437. This is an exemplary approach that now uses the response of the convolutional layers of the network to determine the regions where the objects could be located, instead of relying on an external object proposal method. From the feature vector, a set of one or more fully connected layers (a single layer 441 is shown here) determines the classification 443 for the probabilities of objects in the corresponding object location proposals belonging to one of the object categories. Another, independent set of one or more fully connected layers (a single layer 451 is shown here) determines whether to adjust the corresponding object location proposals for the objects and, if so, makes the adjustments.

This approach has several advantages over the previous methods (e.g. RCNN method) as it incorporates the object proposal technique within the same CNN, as opposed to using external methods. The result is a singular CNN design that handles both object localization (determining which areas correspond to foreground objects) and classification (determining the class of an object), without the need to rely on external object localization methods. Also, since the object localization is inherent in the CNN, the image need only be evaluated once to determine all object locations and their respective labels. This allows for a greater speedup than previous methods that needed to run the CNN for each object image crop. Additionally, since the ROI Selector layer 421 is able to take input from more than one of the scaling layers 410 in the network, it helps detection of objects at various scales. This helps improve accuracy of the object detector when considering objects at different scales in an image. Previous methods (e.g. Faster R-CNN) handle this by constructing a region proposal layer that takes input from a single layer and considers a fixed number of object proposals and aspect ratios. Although useful, this is not as robust as the approach of FIG. 3 that uses inputs across a variety of scales.

Region of Interest (ROI) Selector

Figure 4:
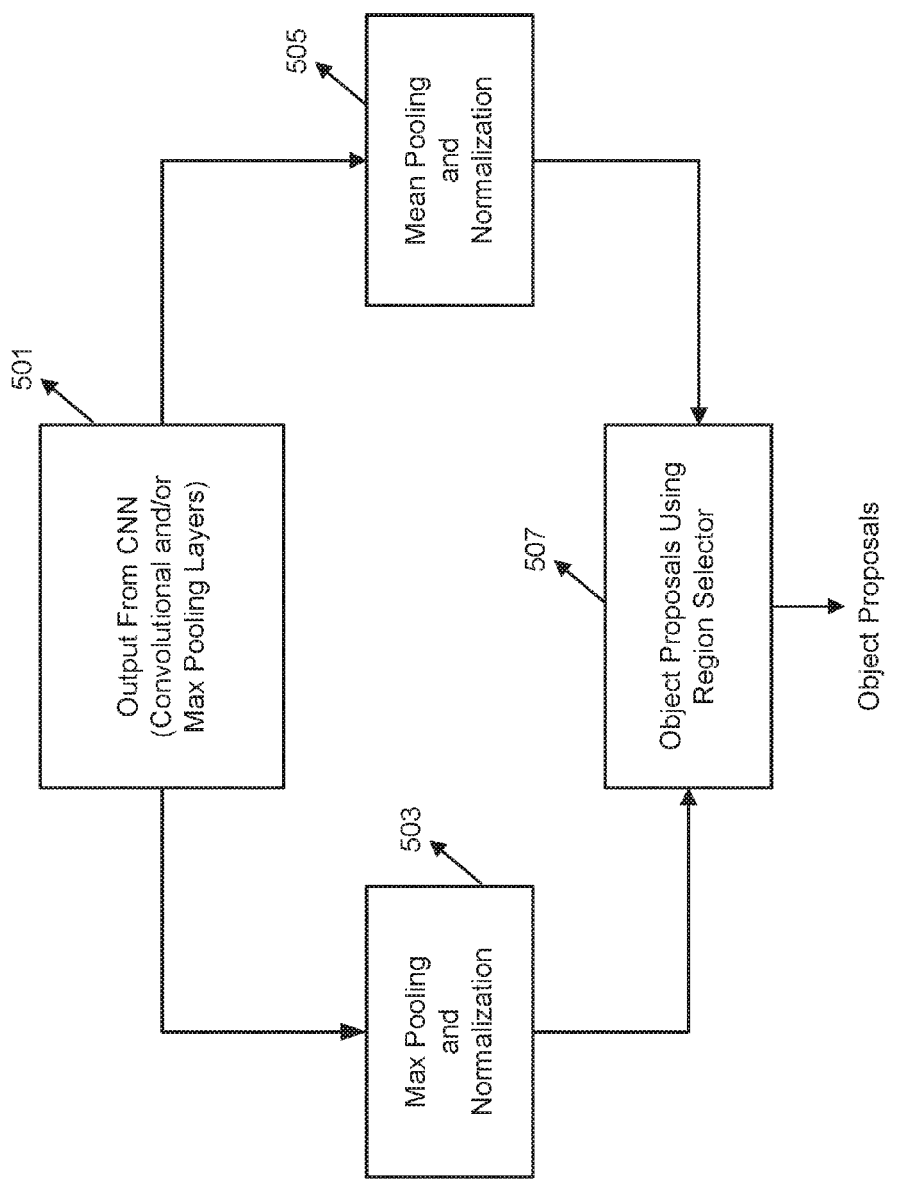
FIG. 4 and FIG. 5 are exemplary flows to illustrate inner working of the Region of Interest Selector layer.
Figure 5:
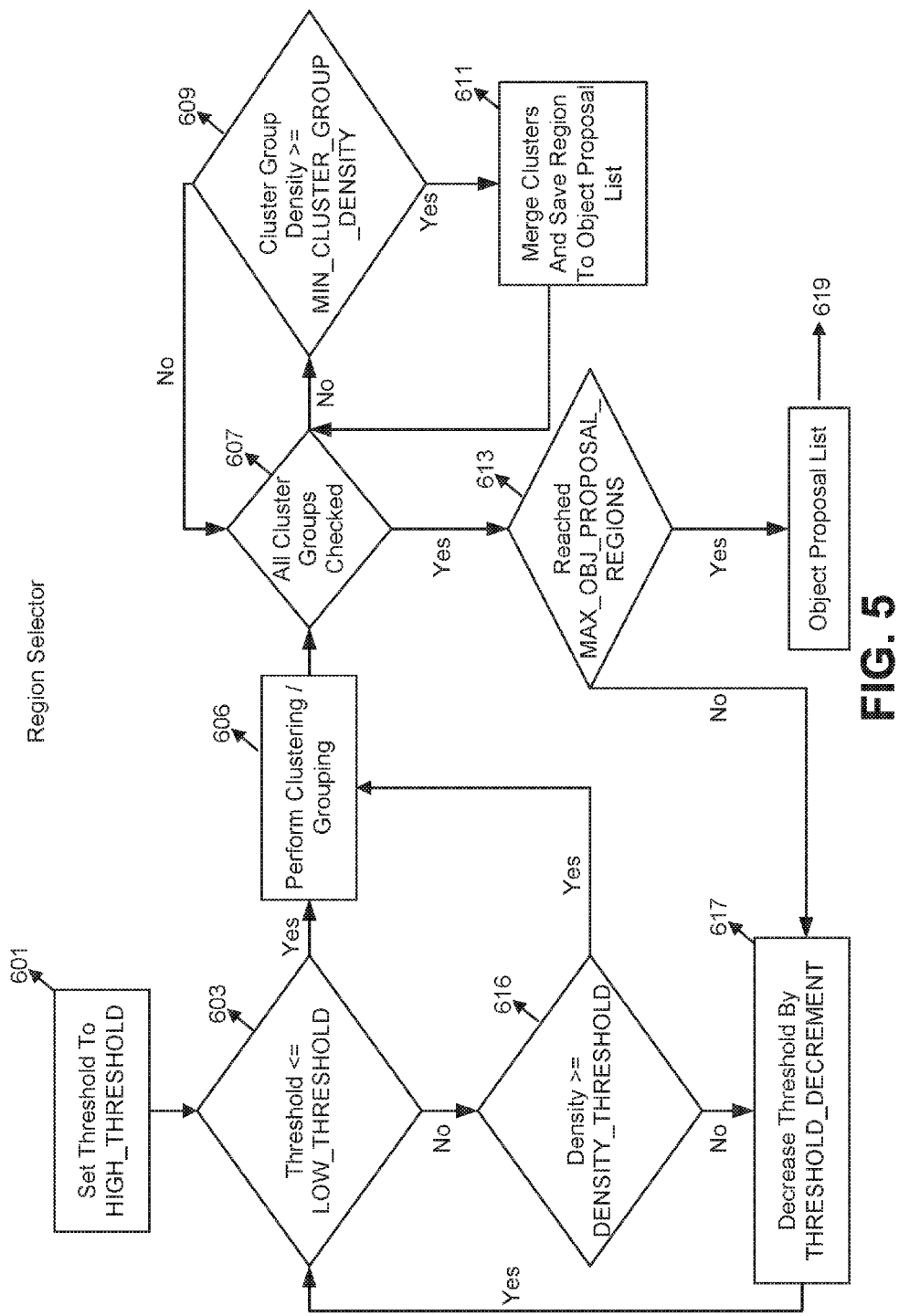

Further explanation of the approach can be given with respect to FIG. 4 and FIG. 5. As illustrated in FIG. 4, the ROI Selector layer receives the output of the set of convolutional and max-pooling layers as inputs at 501 and produces a set of coordinates where objects could be located. The input to the proposed ROI Selector layer is the responses of the scaling convolutional layers. A high value in the convolutional layer indicates a strong filter response. It implies with high confidence presence of a locally connected structure. The stronger the filter response in a local region, the higher the probability of an object being present. Since the ROI Selector layer takes input from different sized convolutional layers, it is able to detect objects at different scales.

Since every channel corresponds to the output of a filter, the systems perform two types of pooling operation over the filters: "max" pooling at 503, which captures a very strong filter response; and "mean" pooling at 505, which captures the overall filter response. The numerical domain of the filter responses is the real positives. Normalizations are then performed using the highest response within the current map, and the result goes to the object proposal block 507, which uses the ROI Selector to generate the object proposals.

Once normalized, the two obtained maps are compared against an adaptive threshold strategy, as illustrated with respect to FIG. 5. The threshold is set to HIGH_THRESHOLD at 601 (where only a few positions in the map are activated) before moving to 603 where the threshold is checked against LOW_THRESHOLD.

If threshold greater than LOW_THRESHOLD, flow passes to 615 where the density of valid activation is checked against the DENSITY_THRESHOLD. If density if less than the DENSITY_THRESHOLD, it means that we do not have enough activations at this specific threshold. Hence, control passes to 617 where the threshold is decremented by THRESHOLD_DECREMENT before going back to 603. This is repeated until either the threshold is less than or equal to LOW_THRESHOLD or density is greater than or equal to DENSITY_THRESHOLD at which point flow goes to 605 to perform clustering/grouping.

In order to produce object proposals, block 605 performs clustering (or grouping) over all locations on the map using, for example, an 8-connected component method. At this level, the obtained maps resemble a scaled version of saliency maps that are used to make region proposals. Thus, each cluster corresponds to an object proposal. However, some of these clusters are fragmented versions of main objects. To handle this, a bottom-up clustering approach to generate object proposals can be followed, looping through all of the cluster groups at 607. Block 609 determines clusters that have a density above the MIN_CLUSTER_GROUP_DENSITY. Once filtered, block 611 merges pairs of the available clusters and generates bounding boxes for object proposals.

Figure 6:
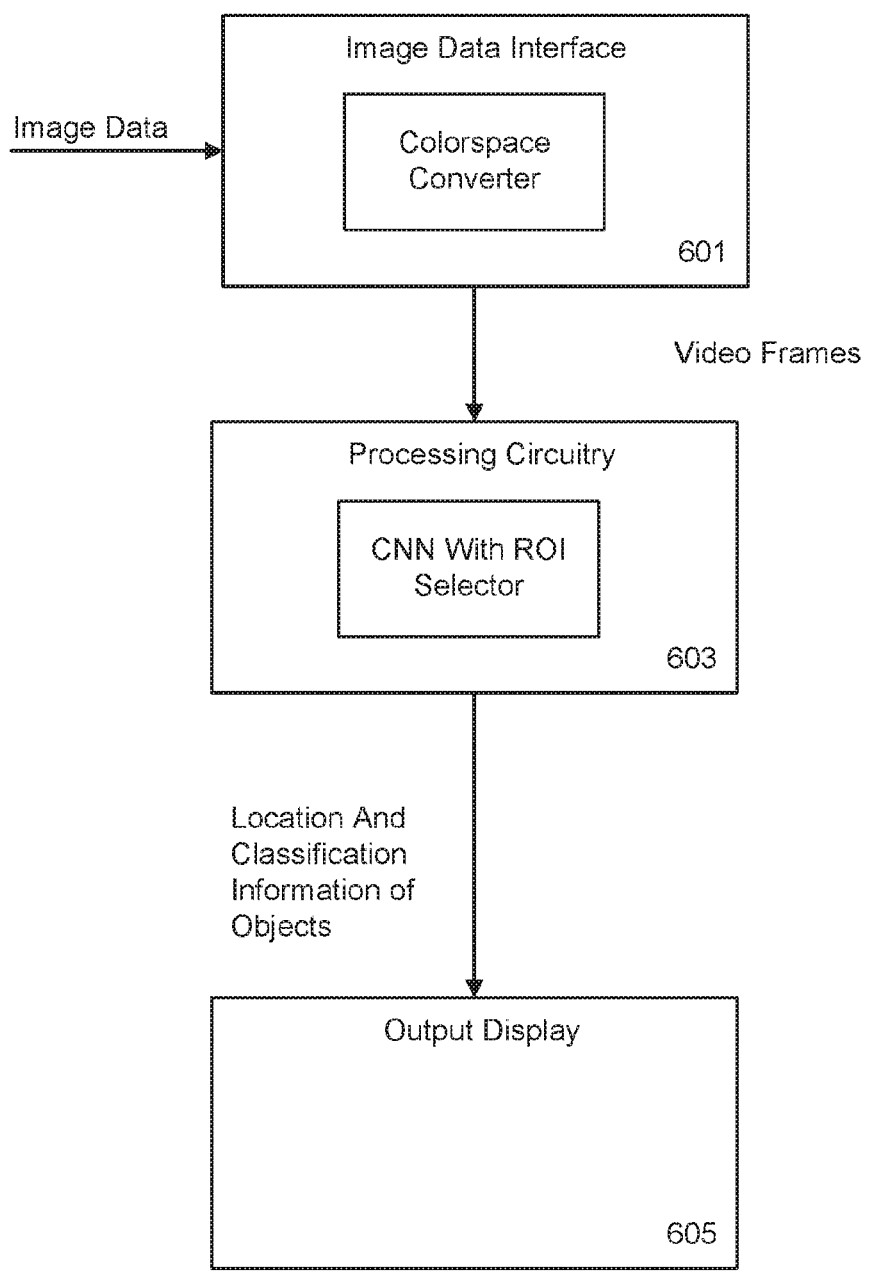
FIG. 6 is a block diagram of a computer vision system in which these processes could be executed.

In case the maximum number of object proposals (MAX_OBJECT_PROPOSALS) is not reached at 613, the flow loops back at 617 to obtain a new set of maps with a lower activation threshold and repeat the described procedure until the desired number of proposals is reached, at which point it exits out at 619 with a list of all object proposals It is understood that the techniques described above can be carried out through software, hardware, firmware, or various combinations of these. FIG. 6 is a block diagram of an example of a computer vision system in which these processes could be executed. The computer vision system includes a vision data interface 601, the CNN 603, and an output display 605 to present the information to the user. The components of the system in FIG. 6 can be implemented through software, hardware, firmware, or various combinations of these. For example, the vision data interface could be an ASIC and the CNN implemented as executable code that can be accessed by and executed on a processor, with the whole system combined with other needed circuitry (power supply and so on) in single physical computer or mobile device (tablet, smart phone), with the output display being a monitor or smart phone. The computer vision system, or portions of it, can also be incorporated into systems such as the data enhanced video viewing system of the U.S. patent application Ser. No. 14/970,210 entitled "Data-Enhanced Video Viewing System and Methods for Computer Vision Processing" by Masood et al., filed Dec. 15, 2015.

The image data interface 601 accepts image data, which can be a single, video or other sequence of images, whether from a live camera feed, stored in memory or other source. For example, it can a series of video frames from a camera or a stream over an internet connection, and conditions the data into a format or formats conducive to vision computing if this is needed. For example, the video data interface might include a color space converter to convert the input vision data from a more traditional RGB color space to the YCbCr or grayscale color space. Computer vision processing often will use the luminance (Y) channel and so the YCbCr color space, unlike the RGB, gives the freedom to use the luminance channel independently of the color channels. If the color space format of the received video frames is already in the desired color, then no conversion need be done, although in some embodiments multiple color space formats may be used at different points in the video processing pipeline.

The Convolutional Neural Network with ROI selector can be implemented as a processing circuitry on one or across several computing devices 603, whether a server, personal computer, laptop, or other general computer, or mobile device (smart phone, tablet), or using a special purposed device. Having a CPU (central processing unit) to execute the various layers will typically be sufficient, with use of a GPU (graphics processing unit) or multiple processors will improve performance. The system can be wrapped in a user-friendly GUI (graphical user interface) interface that can be run on a home machine, such as a laptop or desktop, or it can also be ported to an embedded system. The location and categorization information for objects can then be provided from the processing circuitry to be presented to the user by various forms of output display 605, such as over a cable to a monitor, over a wireless network to a smart phone, or otherwise presented over a corresponding output interface (not shown). In embodiments where the CNN with ROI selector is implemented on a mobile device such as a tablet or smart phone, the display can be that of the device itself.

CONCLUSION

The foregoing detailed description of the invention has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

It is claimed:

1. A method, comprising:
  receiving image data for one or more images;
  processing the image data and generating therefrom location and classification information of objects within the one or more images by a Convolutional Neural Network (CNN), the generating including:
    processing the image data by an initial set of multiple layers including convolutional, pooling and rectified linear unit (ReLU) layers;
    processing output of the initial set of layers by one or more convolutional layers configured to act as scaling layers;
    receiving output of the scaling layers at a Region Of Interest (ROI) selector and generating therefrom a list of one or more object location proposals within the one or more images;
    receiving the generated list at a pooling layer and extracting therefrom a corresponding feature representation for one or more of the object location proposals;
    analyzing the feature representations and corresponding object location proposals by a first set of one or more fully connected layers and, based on said analyzing, constructing a feature vector;
    from the feature vector determining by a second set of one or more fully connected layers a probability of objects in the corresponding object location proposals belonging to one of a plurality of object categories; and
    from the feature vector determining by a third set of one or more fully connected layers of whether to adjust the corresponding object location proposals for the objects, wherein the second and third sets of fully connected layers are independent.

2. The method of claim 1, wherein the image data is from a single image.

3. The method of claim 1, wherein the image data is from a sequence of video frames and wherein the image data from the video frames are processed sequentially.

4. The method of claim 1, wherein generating the list of one or more object location proposals includes:
  performing a first pooling operation to determine strong filter responses from the output of the scaling layers;
  performing a second pooling operation to determine overall filter responses from the output of the scaling layers, where the second pooling operation is distinct from the first pooling operation; and
  generating the list from a combination of the first and second pooling operations.

5. The method of claim 4, wherein generating the list includes:
  comparing the results of first and second pooling operations against an adaptive threshold.

6. The method of claim 4, wherein generating the list includes performing a cluster operation of locations within the image and determining whether to merge locations determined by the cluster operation.

7. The method of claim 1, wherein the processing output of the initial set of layers is by a plurality of convolutional layers configured to act as scaling layers to sequentially filter the output of the initial set of layers, and wherein the ROI selector generates the list of object location proposals from feature representations of object locations at multiple scales from corresponding scaling layers.

8. The method of claim 7, wherein the number and aspect ratios of the locations generated by the ROI selector is variable dependent upon the output of the scaling layers.

9. The method of claim 1, wherein the initial set of multiple layers includes a sequence of a plurality of convolutional layers alternating with pooling units followed by one or more ReLU layers.

10. A computer vision system, comprising:
  an image data interface connectable to receive image data; and
  processing circuitry configured as a Convolutional Neural Network (CNN) connected to receive and process the image data, generating therefrom location and classification information of objects within the one or more images, the generating including:
    processing the image data by an initial set of multiple layers including convolutional, pooling and rectified linear unit (ReLU) layers;
    processing output of the initial set of layers by one or more convolutional layers configured to act as scaling layers;
    receiving output of the scaling layers at a Region Of Interest (ROI) selector and generating therefrom a list of one or more object location proposals within the one or more images;
    receiving the generated list at a pooling layer and extracting therefrom a corresponding feature representation for one or more of the object location proposals;
    analyzing the feature representations and corresponding object location proposals by a first set of one or more fully connected layers and, based on said analyzing, constructing a feature vector;
    from the feature vector determining by a second set of one or more fully connected layers a probability of objects in the corresponding object location proposals belonging to one of a plurality of object categories; and
    from the feature vector determining by a third set of one or more fully connected layers of whether to adjust the corresponding object location proposals for the objects, wherein the second and third sets of fully connected layers are independent.

11. The computer vision system of claim 10, wherein the processing circuitry includes one or more CPUs configurable to perform elements of the generating location and classification information of objects within the one or more images.

12. The computer vision system of claim 10, wherein the processing circuitry includes one or more GPUs configurable to perform elements of the generating location and classification information of objects within the one or more images.

13. The computer vision system of claim 10, wherein image data interface includes one or more ASICs.

14. The computer vision system of claim 10, wherein the image data is from a single image.

15. The computer vision system of claim 10, wherein the image data is from a sequence of video frames and wherein the image data from the video frames are processed sequentially.

16. The computer vision system of claim 10, wherein generating the list of one or more object location proposals includes:
performing a first pooling operation to determine strong filter responses from the output of the scaling layers;
performing a second pooling operation to determine overall filter responses from the output of the scaling layers, where the second pooling operation is distinct from the first pooling operation; and
generating the list from a combination of the first and second pooling operations.

17. The computer vision system of claim 16, wherein generating the list includes:
comparing results of first and second pooling operations against an adaptive threshold.

18. The computer vision system of claim 16, wherein generating the list includes performing a cluster operation of locations within the image and determining whether to merge locations determined by the cluster operation.

19. The computer vision system of claim 10, wherein the processing output of the initial set of layers is by a plurality of convolutional layers configured to act as scaling layers to sequentially filter the output of the initial set of layers, and wherein the ROI selector generates the list of object location proposals from feature representations of object locations at multiple scales from corresponding scaling layers.

20. The computer vision system of claim 19, wherein the number and aspect ratios of the locations generated by the ROI selector is variable dependent upon the output of the scaling layers.

21. The computer vision system of claim 10, wherein the initial set of multiple layers includes a sequence of a plurality of convolutional layers alternating with pooling units followed by one or more ReLU layers.

22. The computer vision system of claim 10, further comprising:
an output interface configured to provide the generated location and classification information to a user.

23. The computer vision system of claim 10, wherein at least a portion of the processing circuitry is part of a mobile device including a display, where the display is connected to said at least a portion of the processing circuitry and configured to provide the generated location and classification information to a user.

* * * * *